UNITED STATES PATENT OFFICE.

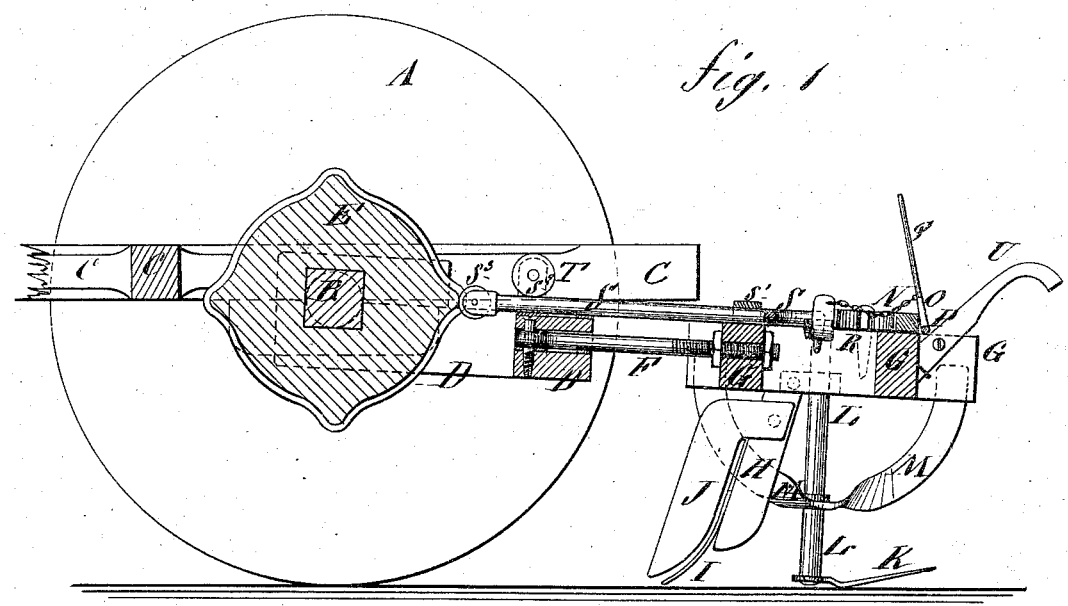

THEODORE C. BURNHAM, OF WACO, TEXAS.

IMPROVEMENT IN COTTON-CHOPPERS.

Specification forming part of Letters Patent No. 160,811, dated March 16, 1875; application filed August 10, 1874.

*To all whom it may concern:*

Be it known that I, THEODORE C. BURNHAM, of Waco, in the county of McLennan and State of Texas, have invented a new and useful Improvement in Cotton-Choppers, of which the following is a specification:

Figure 1 is a vertical longitudinal section of my improved machine, taken through the line $x\ x$, Fig. 2. Fig. 2 is a top view of the same.

Similar letters of reference indicate corresponding parts.

The invention will first be fully described, and then pointed out in the claims.

A are the wheels, which are rigidly attached to the journals of the axle B, so as to carry the said axle with them in their revolution. The axle B revolves in bearings attached to the frame C, to which the draft is applied. The axle B also revolves in bearings in the forward end of the frame D, which is slotted to receive the wheel E. The wheel E is made in the general form of a circle, and has four, more or less, double-inclined projections formed upon its face, and has narrow flanges formed upon the side edges of its face, as shown in Figs. 1 and 2. In the rear end of the frame D is formed a horizontal slot, in which is pivoted the forward end of the rod F, so that the rear end of said rod may have a free lateral movement. The rear end of the draw-rod F is swiveled to the forward end of the frame G, so that the said frame may be free to incline to either side to adjust itself to any unevenness in the surface of the ground. To the side bars of the frame G are attached the upper ends of the standards H, to the lower ends of which are attached the bearing-off plows I. To the inner sides of the standards H are attached cutters J to separate the soil around the plants from that acted upon by the plows, and prevent it from being broken away by the plows from around the plants.

The guard-cutters J enable the plows I to work closer to the plants than would otherwise be possible.

K are the chopper-knives, which are attached to the lower ends of the rods or shafts L, and which project rearward and inward, so that their inner ends may meet or slightly overlap at an angle. The shafts L pass up through brackets M, attached to the frame G, and by which they are supported against the draft-strain. The shafts L pass up through bearings attached to the side bars of the frame G, are bent inward above said side bars, and their ends are bent upward, and have holes formed through them to receive the forward ends of the rods, chains, or cords N, the rear ends of which are attached to an arm, O, formed upon or attached to the shaft P. The shaft P works in bearings attached to the rear part of the frame G, and to it is attached a crank or arm, Q, so that by operating the said arm the knives K may be held back, and prevented from operating, when desired.

R is a spring, attached to the frame G, and which rests against the upper ends of the shafts L, to hold the knives K against the draft-strain.

The spring R is made of such a strength as to hold the knives to their work under ordinary circumstances; but, should said knives strike anything they cannot cut, the spring R will yield, and allow the knives to swing back and pass the obstruction.

In the inwardly-projecting arms of the shafts L are formed holes to receive the hooks formed upon the forked rear end of the rod S. The rod S passes forward through guides $s^1\ s^2$, attached to the frames G and D, and to its forward end is pivoted a friction-roller, $s^3$, which rests against the face of the wheel E, against which it is held by the spring R.

By this construction, as the wheel E revolves, each of its projections will push the rod S back, and thus swing the knives K back, allowing a number of stalks to stand uncut.

In the forward bearing $s^2$ is pivoted a friction-roller, T, to diminish the friction caused by the upward pressure of the rod S as it is pushed back by the projections of the wheel E.

The frame G and its attachments are guided by means of handles U, attached to the rear end of the said frame G.

Having thus described my invention, I claim as new and desire to secure by Letters Patent—

1. The combination of the horizontal knives K, the vertical shafts L, having inwardly-projecting arms formed upon their upper ends, and the spring R with each other, and with the frame G, that carries the plows, substantially as herein shown and described.

2. The combination of the rods or chains N and armed shaft O P Q with the shafts L, forked rod S, and wheel E, and with the frame G, substantially as herein shown and described.

THEODORE CATLIN BURNHAM.

Witnesses:
J. A. BLUNDELL,
J. M. FLETCHER.